Figure 3:
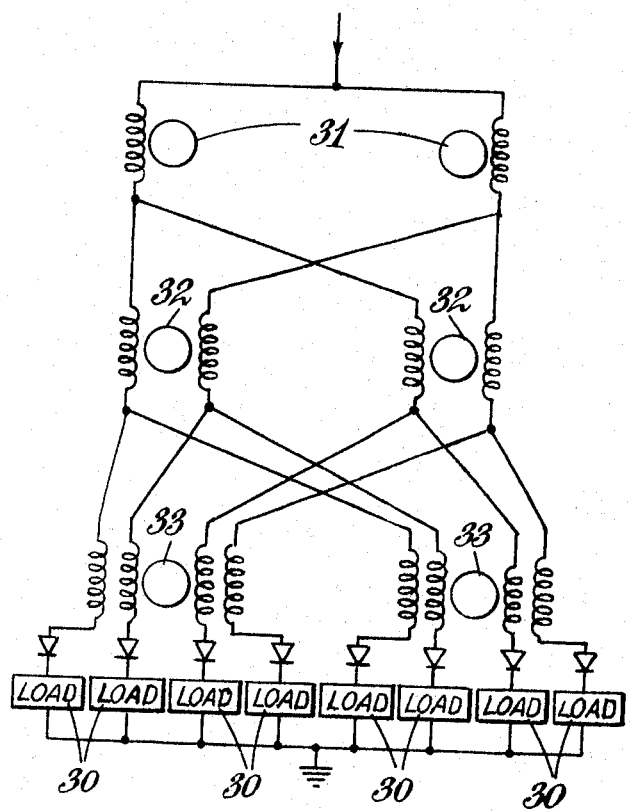

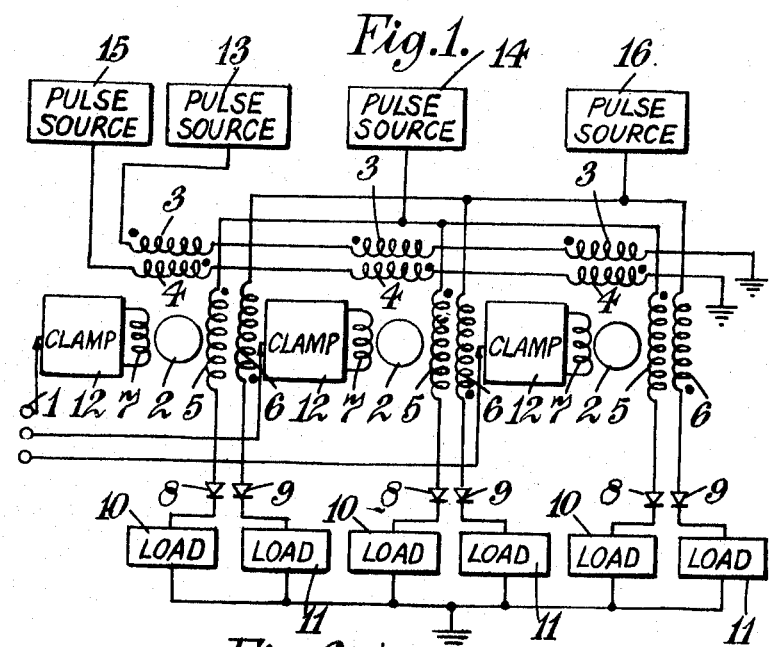
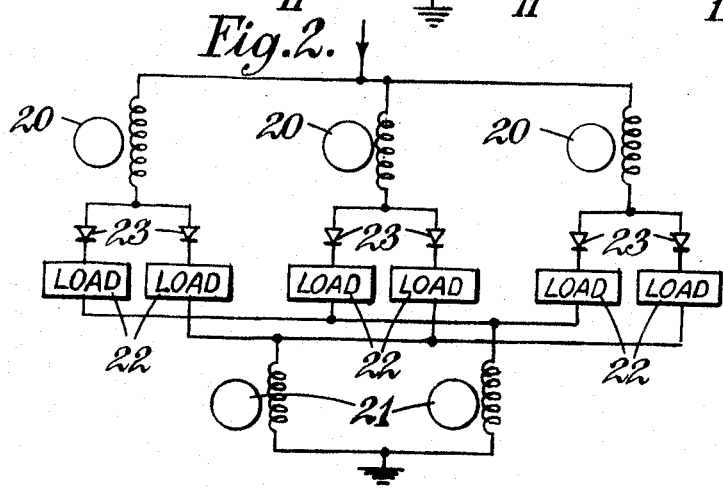

April 25, 1967 J. A. ASHTON 3,316,537
MAGNETIC CORE LOAD SELECTION SYSTEM
Filed Jan. 29, 1964 2 Sheets-Sheet 2

United States Patent Office 3,316,537
Patented Apr. 25, 1967

3,316,537
MAGNETIC CORE LOAD SELECTION SYSTEM
John Alfred Ashton, Stoneleigh, Epsom, England, assignor to Decca Limited, London, England, a British company
Filed Jan. 29, 1964, Ser. No. 340,902
Claims priority, application Great Britain, Jan. 31, 1963, 3,974/63
16 Claims. (Cl. 340—166)

This invention relates to systems for steering an electric current to a selected load. For many purposes, particularly in digital data processing apparatus, it is required to feed a current to a selected one out of a number of possible load circuits; for example, in a ferrite core store matrix, a current may have to be fed to any one out of a number of addressing wires coupled to cores in the matrix.

According to this invention, a system for steering an electric current to a selected one out of a number of separate loads comprises a corresponding number of square loop magnetic cores, an interrogate winding on each core, drive means for applying currents simultaneously to the interrogate windings of all the cores in a sense such as to switch the cores from a "re-set" state to a "set" state, clamping circuits for each core operable, when energised, to put a low impedance or short circuit across a clamping winding on the associated core, selector means for selectively energising one clamping circuit so as to prevent the selected core from switching on application of current to the interrogate windings, and a drive winding on each core connected in series with a uni-directional element (e.g. a diode), a load and a load current source, the uni-directional element being arranged to be driven to cut-off by the E.M.F. developed across the associated drive winding when the associated core switches to the "set" state.

In this current steering system, initially all the cores are in the "re-set" state. One core is clamped by putting a short-circuit across its clamping winding and this core therefore does not switch when the current is fed to the interrogate windings. All the other cores will switch to the "set" state but, when they switch, the E.M.F.'s developed across their drive windings cause their series unidirectional elements to be cut-off. No such E.M.F. is developed across the drive winding of the clamped core and therefore current flows from the load current source through the selected load. Generally it is convenient to use a single load current source so that the various circuits each containing a load, drive winding and uni-directional element are in parallel. Current steering however is complete provided the back E.M.F. across the selected load, the drive winding of the clamped core and the associated uni-directional element is less than the E.M.F. developed by the drive windings of the switching cores by an amount such that the unidirectional elements in series with drive windings on switched cores remain blocked. In such an arrangement, when the E.M.F.'s due to switching of cores fall to zero, the current will divide between all the parallel branches according to their respective impedances. Generally there would be many branches and the small proportion of the current flowing through unselected loads is often of no importance. The system can be arranged however so that the current from the load current source is cut-off before the switching terminates.

The aforementioned clamping circuits provide when energised, a low impedance or short circuit across the clamping windings. When unenergised they are preferably arranged each to provide a high impedance or an open circuit across the associated clamping winding so that they have negligible effect on the clamping windings. The clamping circuits may conveniently each consist of a single transistor.

The drive means for all the cores may conveniently use a single source of drive current, for example by connecting the interrogate windings in series. Where the currents to be steered are constant, it may be possible to use the same current source for the interrogate windings and for the load.

If only a single pulse has to be fed to a single selected load, a re-setting pulse must be applied to the circuit between operations. For many purposes, however, it is required to provide two consecutive pulses to a pair of loads and the above described arrangement can be used very conveniently for this purpose, the second pulse being supplied by a re-setting operation. Such pairs of pulses might be required, for example, as "read" and "write" drives to a matrix core, the two pulses having to be supplied to the same address. More generally however the two pulses may be supplied to two separate load circuits of a pair of associated loads. For this purpose, the two load circuits of each pair are separately connected in series with uni-directional devices and separate drive windings on the appropriate core, the two drive windings being wound in opposite directions. The two loads associated with each core are fed from separate load current sources. During the first phase, referred to hereinafter as the X phase, the selected core is clamped whilst the other cores are driven to the "set" state and the current steered to one load as previously described. By subsequently in a Y phase applying a current to further interrogate windings on all the cores but wound in the opposite sense to the first mentioned interrogate windings, the cores are driven to the "re-set" state. The clamped core will not switch because it is already in that state but the other cores will be re-set to be ready for a subsequent cycle of operation. The E.M.F.'s developed across the drive windings of the further cores will prevent current being steered into their associated loads but current will be steered into load associated with the clamped core. The X and Y phase load current sources would have to be appropriately controlled to be operative one in the X phase period and the other in the Y phase period.

The current steering system might have one core for each load or for each pair of loads in a two phase system. With a large number of loads, it is more economical to sub-divide the current steering into two or more stages, each stage having a number of square loop cores as described above. For example if there are $mn$ loads (or pairs of loads in a two phase system) a "tree" decoder might be employed having a first stage with $m$ cores, each having a drive winding fed in parallel from a load current source, and a second stage with $n$ cores each having $m$ drive windings connected to drive windings on separate cores of the first set and feeding the loads. More than two stages may be employed in this manner. Alternatively the $mn$ loads might be selectively supplied by a "split" decoder having a first stage with $m$ cores and a second stage with $n$ cores, each core on the first stage having one drive winding connected to $n$ loads in parallel so that the $m$ cores in effect select one out of $m$ current sources. The $n$ cores of the second stage each have one drive winding connected to the opposite ends of $n$ loads so that the second stage in effect selects one out of $n$ current sinks. It is possible to combine a "tree" encoder with a "split" encoder. It is thus readily possible to select one load (or one pair of loads in a two phase system) out of $n_1 \times n_2 \times n_3 \ldots n_k$ loads (or pairs of loads).

The following is a description of a number of embodiments of the invention, reference being made to the accompanying drawings in which:

FIGURE 1 is a circuit diagram for explaining the operation of the invention; and FIGURES 2 and 3 are diagrams illustrating how the circuit of FIGURE 1 may be extended for selecting one of a large number of loads.

Referring to FIGURE 1, there is shown a circuit for a two phase system in which any one pair out of three pairs of loads is to be selected, one load of the pair being fed in the X phase and the other in the Y phase. The selection is effected by energising a selected one out of the three input wires 1 during any complete cycle of operations consisting of X and Y phases. The circuit contains three similar cores 2, which have approximately rectangular hysteresis loops, and which are wound with interrogate windings 3, 4, drive windings 5, 6, and a clamp winding 7. Dots indicate winding starts. The circuit also contains diodes 8, 9, and pairs of loads 10, 11. The inputs are applied to units 12, whose function is to place a low impedance, or short circuit, across the associated clamp winding 7, when that input is energised, and a high impedance, or open circuit, when that input is not energised. The units 12 may each consist of a single transistor.

There are provided current sources 13 and 15 which produce constant current pulses in the X and Y phases respectively, and current sources 14 and 16 which produce the current pulses which are to be steered respectively to the selected loads 10 and 11 in the X and Y phases. Where the currents to be steered are constant, i.e., rectangular, it is permissible to connect the circuits in series so that, for example, the functions of current sources 13 and 14 are performed by a single current generator.

It is assumed that current into the dot end of a winding tends to switch the core to the "set" state of remanence. Initially all the cores 2 are in the "re-set" state. Current from the current source 13 applied to the interrogate windings 3 is in such a sense as to cause all cores to switch. However, the core selected by the particular input 1 which is energised is prevented from switching by the short circuit across its clamp winding 7. Thus only the two unclamped cores switch. As these cores switch, E.M.F.'s are developed across their drive windings 5, which are of such polarity as to cause their series diodes 8, to be driven towards cut-off. No such E.M.F. is developed across the drive winding of the clamped core, and therefore the current from pulse generator 14 flows down this path to the corresponding load 10. Current steering is complete provided that the back E.M.F. across the series combination of clamped core, diode, and load is less than the E.M.F. developed by the drive winding of each of the switching cores, as under these conditions the diodes in the switching branches of the network remain blocked. When all flux has been switched in the cores, the E.M.F.'s fall to zero and the current divides between all branches according to their respective impedances. In a practical system, where there are many branches, this small proportion of the current flowing in unselected loads is often of no importance, but alternatively the circuit parameters may be designed so that the current pulse from generator 14 is terminated before switching ceases.

The operation of the circuit is not loaded by the network connected to drive windings 6, as this network contains no closed loops which do not include back-to-back diodes.

With all cores initially re-set, the action of X phase drive causes two of the cores to switch to the set state, and the clamped core remains in the re-set state. During Y phase the action is similar, except that current generator 15 pulses the cores in the reverse, or re-setting, direction via interrogate windings 4, and the current from generator 16 is steered by drive windings 6, and diodes 9, into load 11. In this phase, however, the core of the selected path is prevented from switching, not by the clamp on winding 7, but rather because the core is already saturated in the re-set direction. As the load 11, into which current flows during phase Y is determined by the load 10, which is selected during phase X, a pair of X and Y pulses is always steered to a corresponding pair of loads.

FIGURES 2 and 3 illustrate ways in which the circuit of FIGURE 1 may be extended to select larger number of loads. In each case, only one of the drive winding networks is shown, and interrogate and clamp windings are omitted, it being understood that in these details the circuits are exactly similar to FIGURE 1.

FIGURE 2 shows a "split" decoder consisting of a "one out of three" circuit having cores 20 and a "one out of two" circuit having cores 21 connected to steer current to any one out of six loads 22 via six diodes 23. With one core of each group prevented from switching, there is one, and only one, path through the network which contains no switching cores and through which, therefore, the current is steered. All other paths contain at least one drive winding that is developing E.M.F. to block the appropriate diodes.

FIGURE 3 shows a "tree" decoder which steers current to any one out of eight loads 30. The operation of this circuit is also, in principle, exactly the same: i.e. only one path includes no E.M.F.'s, and the current is steered down this path. In the arrangement of FIGURE 3, a first pair of cores 31 effect a first "one out of two" selection, a second pair of cores 32 effect a second "one out of two" selection whilst a third pair of cores 33 effect a third "one out of two" selection.

Although with reference to FIGURES 2 and 3, selection of any one out of a number of loads has been described, the two phase arrangement of FIGURE 1 may be employed so that one pair of loads out of a number of pairs may be selected for two phase operation.

The techniques of FIGURES 2 and 3 are used to minimise the numbers of windings on some of the cores where many loads are to be selected and to minimise power consumption by reducing the number of cores that are switched. The two techniques may be used in combination to further decrease the numbers of windings, and in fact the number of windings that can be threaded through a core is the only limitation on the size of the circuit.

I claim:

1. A system for steering an electric current to a selected one out of a number of separate loads comprising a corresponding number of square loop magnetic cores, an interrogate winding on each core, a clamping winding on each core, drive means for applying currents simultaneously to the interrogate windings of all the cores in a sense such as to switch the cores from a "re-set" state to a "set" state, clamping circuits for each core operable, when energized, to put a low impedance across said clamping winding on the associated core, selector means for selectively energizing one clamping circuit so as to prevent the selected core from switching on application of current to the interrogate windings, a drive winding on each core connected in series with a uni-directional element and a load, and a load current source arranged to feed each drive winding, the uni-directional element being arranged to be driven to cut-off by the E.M.F. developed across the associated drive winding when the associated core switches to the "set" state.

2. A current steering system as claimed in claim 1 wherein a single load current source is provided so that the various circuits each containing a load, drive winding and uni-directional element are in parallel.

3. A current steering system as claimed in claim 2 wherein means are provided for cutting-off the current from the load current source before the switching terminates.

4. A current steering system as claimed in claim 1 wherein said uni-directional elements are diodes.

5. A current steering system as claimed in claim 1 wherein said clamping circuits are each arranged, when unenergized, to provide a high impedance across the associated clamping winding.

6. A current steering system as claimed in claim 5 wherein each clamping circuit comprises a transistor.

7. A current steering system as claimed in claim 1 wherein the drive means for all the cores comprise a single source of drive current.

8. A system for steering a single electric pulse to a selected one out of a number of separate loads comprising a corresponding number of square loop magnetic cores, an interrogate winding on each core, a clamping winding on each core, drive means for applying a current pulse simultaneously to the interrogate windings of all the cores in a sense such as to switch the cores from a "re-set" state to a "set" state, clamping circuits for each core operable, when energized, to put a low impedance across said clamping winding on the associated core, selector means for selectively energizing one clamping circuit so as to prevent the selected core from switching on application of current to the interrogate windings, a drive winding on each core connected in series with a uni-directional element and a load, a load current source arranged to feed each drive winding, the uni-directional element being arranged to be driven to cut-off by the E.M.F. developed across the associated drive winding when the associated core switches to the "set" state, and means for applying a re-setting pulse to the cores after the termination of said current pulse.

9. A current steering system as claimed in claim 1 wherein the current steering is sub-divided into two or more stages.

10. A system for steering two consecutive current pulses to the respective loads of a selected pair of loads out of a number of pairs of loads comprising a number of square loop magnetic cores corresponding to the number of pairs of loads, first and second interrogate windings wound in opposite sense on each core, a clamping winding on each core, drive means for applying currents alternately to the first interrogate windings of all the cores and to the second interrogate windings of all the cores, a separate clamping circuit for each core operable, when energized, to put a low impedance across said clamping winding on the associated core, selector means for selectively energizing one clamping circuit so as to prevent the selected core from switching on application of current to the interrogate windings, separate load current sources for the two loads associated with each core, a uni-directional element in series with each load, and two drive windings wound in opposite directions on each core with each drive winding connected in series with a load and its load current source, each uni-directional element being arranged to be driven to cut-off by the E.M.F. developed across the associated drive winding when the associated core switches in one of its two directions of switching, the particular direction being dependent on the sense of the drive winding in series with the uni-directional element.

11. In a system for steering two consecutive electric current pulses to respective loads a pair of loads selected out of a number of pairs of loads, a current steering stage comprising a number of square loop magnetic cores corresponding to the number of pairs of loads for that stage, first and second interrogate windings wound in opposite sense on each core, a clamping winding on each core, drive means for applying currents alternately to the first and to the second interrogate windings of all the cores, a separate clamping circuit for each core operable, when energized, to put a low impedance across said clamping winding on the associated core and, when unenergized, to put a high impedance across the clamping winding, selector means for selectively energizing one clamping circuit so as to prevent the selected core from switching on application of current to the interrogate windings, separate load current sources for the two loads associated with each core, a unidirectional element in series with each load, two drive windings wound in different directions on each core with each drive winding connected in series with a load and its load current source, each uni-directional element being arranged to be driven to cut-off by the E.M.F. developed across the associated drive winding when the associated core switches in one of its two directions of switching, the particular direction being dependent on the sense of the drive winding in series with the uni-directional element.

12. A current steering system as claimed in claim 11 having $mn$ pairs of loads and arranged as a "tree" decoder having a first stage with $m$ cores, each having a first drive winding fed in parallel from a first load current source and a second drive winding fed in parallel from a second load current source, and a second stage with $n$ cores each having $m$ first drive windings connected to drive windings on separate cores of the first set and each feeding one load and $m$ second drive windings connected to drive windings on separate cores of the first set and each feeding one load.

13. A current steering system as claimed in claim 11 having $mn$ pairs of loads and arranged as a "split" decoder having a first stage with $m$ cores and a second stage with $n$ cores, each core on the first stage having a first drive winding connected to one end of $n$ loads in parallel and a second drive winding connected to one end of $n$ loads in parallel and wherein the $n$ cores of the second stage each have a first drive winding connected to the opposite ends of the said $n$ loads connected to the first drive winding of the first stage and second drive windings connected to opposite ends of the said $n$ loads connected to the second drive windings of the second stage.

14. In a system for steering an electric current to a selected one out of a number of separate loads and having at least two stages of current steering, a current steering stage comprising a number of square loop magnetic cores, an interrogate winding on each core, a clamping winding on each core, drive means for applying currents simultaneously to the interrogate windings of all the cores in a sense such as to switch the cores from a "re-set" state to a "set" state, clamping circuits for each core operable, when energized, to put a low impedance across said clamping winding on the associated core and, when unenergized, to put a high impedance across the clamping winding, selector means for selectively energizing one clamping circuit so as to prevent the selected core from switching on application of current to the interrogate windings, a drive winding on each core connected in series with a uni-directional element and a load, and a load current source arranged to feed each drive winding, the unidirectional element being arranged to be driven to cut-off by the E.M.F. developed across the associated drive winding when the associated core switches to the "set" state.

15. A current steering system as claimed in claim 14 comprising two current steering stages and having $mn$ loads and arranged as a "tree" decoder having a first stage with $m$ cores, each having a drive winding fed in parallel from a load current source, and a second stage with $n$ cores each having $m$ drive windings connected to drive windings on separate cores of the first set and feeding the load.

16. A current steering system as claimed in claim 14 comprising two current steering stages and having $mn$ loads and arranged as a "split" decoder having a first stage with $m$ cores and a second stage with $n$ cores, each core on the first stage having one drive winding connected to $n$ loads in parallel and wherein the $n$ cores of the second stage each have one drive winding connected to the opposite ends of $n$ loads.

No references cited.

NEIL C. READ, *Primary Examiner.*

H. PITTS, *Assistant Examiner.*